(12) United States Patent
Wang et al.

(10) Patent No.: US 7,978,271 B2
(45) Date of Patent: Jul. 12, 2011

(54) MULTI-DOMAIN LIQUID CRYSTAL DISPLAY AND ARRAY SUBSTRATE THEREOF COMPRISING A STORAGE CAPACITOR HAVING AN AUXILIARY ELECTRODE CONTROLLED BY A PRECEDING SCAN LINE OR SIGNAL LINE

(75) Inventors: Wen-Chun Wang, Taichung (TW); Chin-Chang Liu, Taichung County (TW)

(73) Assignee: Wintek Corporation, Taichung (TW)

( * ) Notice: Subject to any disclaimer, the term of this patent is extended or adjusted under 35 U.S.C. 154(b) by 331 days.

(21) Appl. No.: 12/133,914

(22) Filed: Jun. 5, 2008

(65) Prior Publication Data
US 2008/0303999 A1 Dec. 11, 2008

(30) Foreign Application Priority Data

Jun. 8, 2007 (TW) .............................. 96120626 A (51) Int. Cl.
G09G 3/36 (2006.01)
G02F 1/1343 (2006.01)
G02F 1/1337 (2006.01)
G02F 1/141 (2006.01)

(52) U.S. Cl. ............ 349/37; 349/39; 349/130; 349/144; 349/147

(58) Field of Classification Search .................... 349/37, 349/144, 129, 130, 147
See application file for complete search history.

(56) References Cited

U.S. PATENT DOCUMENTS

| 6,822,724 | B2 | 11/2004 | Ogishima et al. |
| 6,839,104 | B2 | 1/2005 | Taniguchi et al. |
| 2004/0041770 | A1 | 3/2004 | Kubo et al. |
| 2007/0040951 | A1* | 2/2007 | Lee et al. ......................... 349/38 |
| 2007/0052902 | A1* | 3/2007 | Yoo et al. ...................... 349/144 |
| 2007/0058122 | A1* | 3/2007 | Ong .............................. 349/143 |

* cited by examiner

*Primary Examiner* — David Nelms
*Assistant Examiner* — Dennis Y Kim
(74) *Attorney, Agent, or Firm* — Muncy, Geissler, Olds & Lowe, PLLC (57) ABSTRACT

A multi-domain liquid crystal display includes a first and a second transparent substrates, a liquid crystal layer interposed between them, a common electrode, a first and a second metal layers, a first and a second dielectric layer, multiple pixel electrodes and multiple auxiliary electrodes. The second metal layer is formed on the first dielectric layer, and the second dielectric layer is formed on the first dielectric layer and covers the second metal layer. The pixel electrodes are formed on the second dielectric layer, each of the pixel electrodes having at least one opening to divide itself into a plurality of sections. The auxiliary electrodes are formed on the second dielectric layer, and each of the auxiliary electrodes extends into the opening of the pixel electrode. The second metal layer is hollowed out at a position overlapping the auxiliary electrode to form at least one opening.

20 Claims, 13 Drawing Sheets

MULTI-DOMAIN LIQUID CRYSTAL DISPLAY AND ARRAY SUBSTRATE THEREOF COMPRISING A STORAGE CAPACITOR HAVING AN AUXILIARY ELECTRODE CONTROLLED BY A PRECEDING SCAN LINE OR SIGNAL LINE

CROSS REFERENCE TO RELATED APPLICATION

This application claims priority of application No. 096120626 filed in Taiwan R.O.C on Jun. 8, 2007 under 35 U.S.C. §119; the entire contents of which are hereby incorporated by reference.

BACKGROUND OF THE INVENTION

1. Field of the Invention

The invention relates to a multi-domain liquid crystal display and its array substrate.

2. Description of the Related Art

Typically, the display contrast ratio and response speed offered by a VA (vertically-aligned) mode liquid crystal display, which uses negative liquid crystal materials and vertical alignment films, are better than a TN (twisted-nematic) mode LCD, since liquid crystal molecules are aligned in a vertical direction when no voltage is applied. Also, it is known the viewing angle performance of a VA mode LCD is improved by setting the orientation directions of the liquid crystal molecules inside each picture element to a plurality of mutually different directions; that is, forming multiple distinct domains in the liquid crystal display.

Figure 11A:
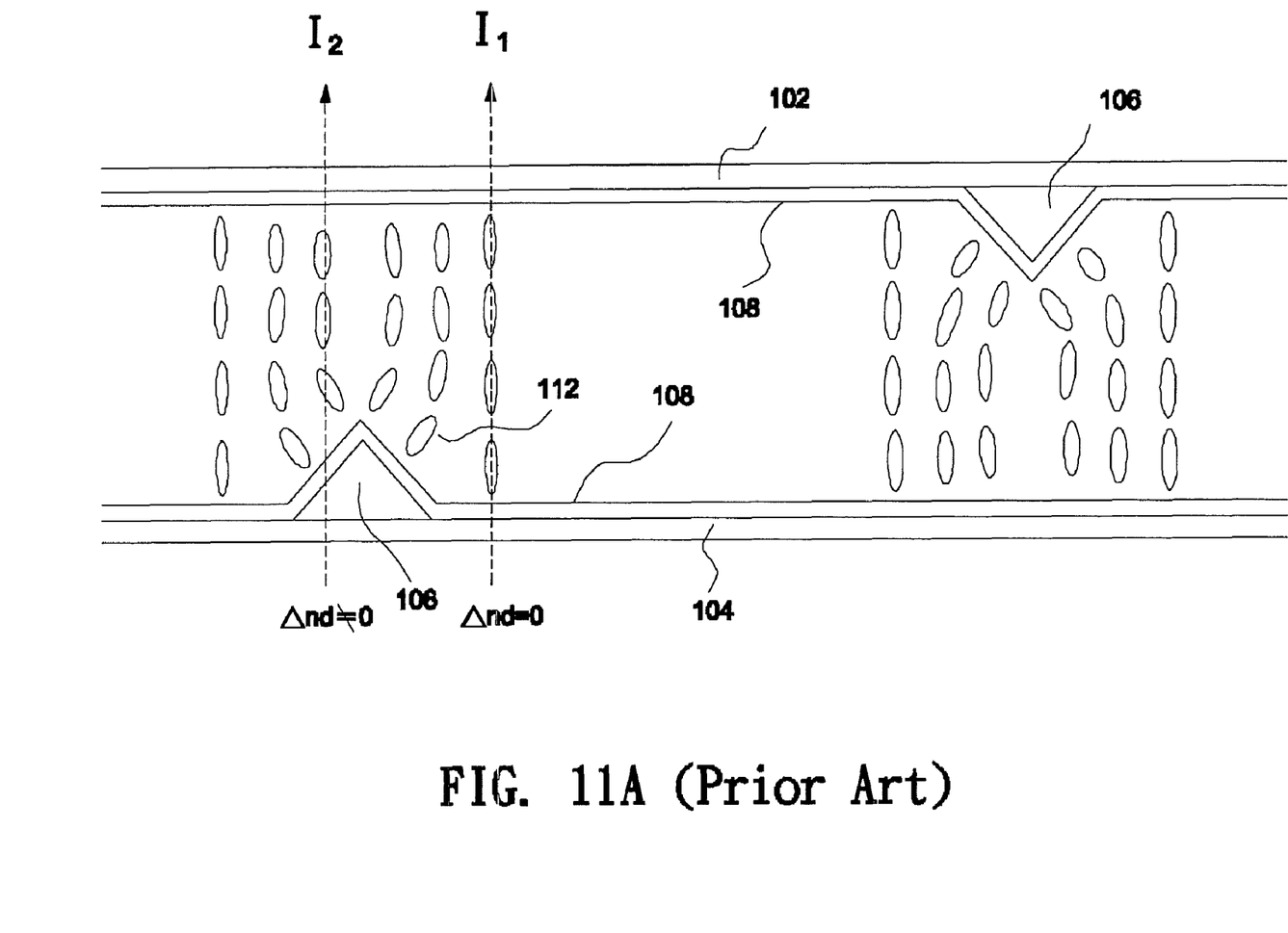
FIG. 11A shows a schematic diagram illustrating a conventional design of a multi-domain vertically aligned liquid crystal display.

FIG. 11A shows a schematic diagram illustrating a conventional design of a multi-domain vertically aligned liquid crystal display (MVA LCD). Referring to FIG. 11A, a top substrate 102 and a bottom substrate 104 are both provided with protrusions 106 having different inclined surfaces and covered by vertical alignment films 108. Hence, the liquid crystal molecules 112 near the inclined surfaces orientate vertically to the inclined surfaces to have different degrees of pre-tilt angles. In case the pre-tilt liquid crystal molecules exist, surrounding liquid crystal molecules 112 are tilted in the directions of the pre-tilt liquid crystal molecules 112 when a voltage is applied. Thus, multiple domains each having individual orientation direction of liquid crystal molecules 112 are formed. Besides, the domain-regulating structure for providing inclined surfaces includes, but is not limited to, the protrusions 106, and other structure such as a via structure 114 shown in FIG. 11B may also be used.

Figure 11B:
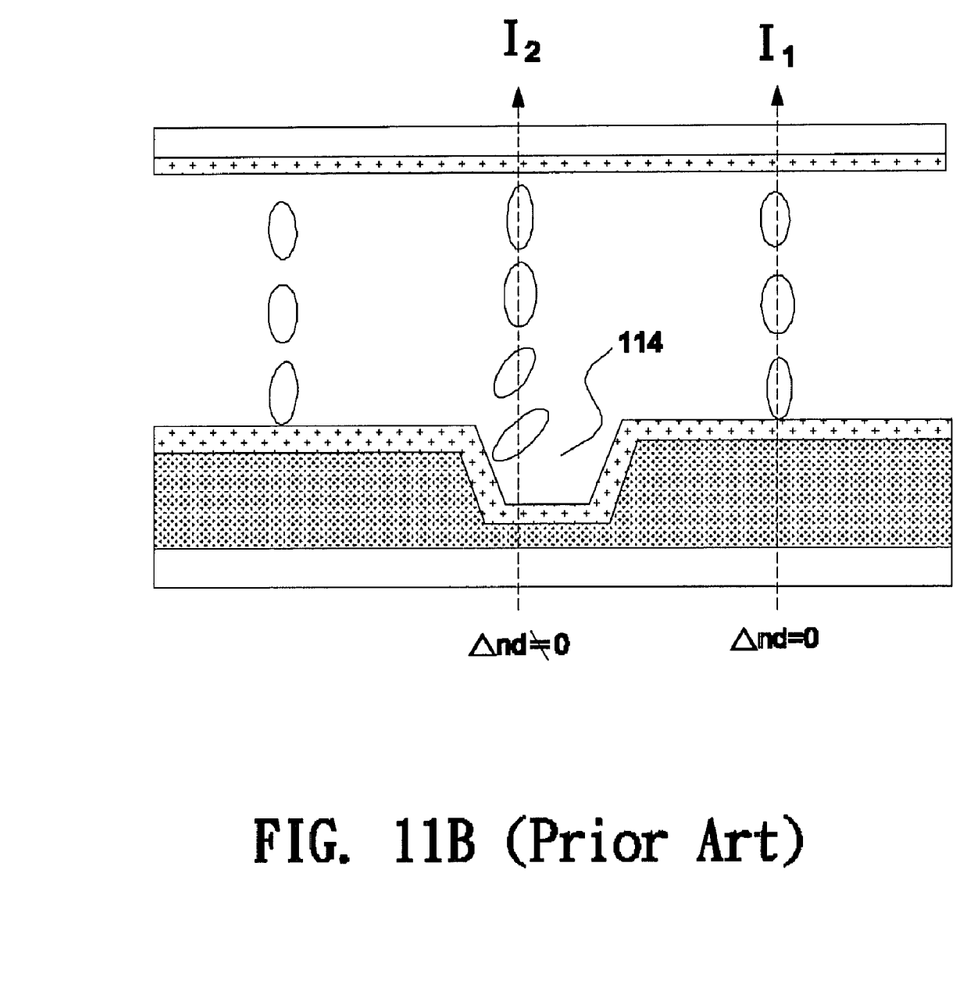
FIG. 11B shows a schematic diagram illustrating another conventional design of a multi-domain vertically aligned liquid crystal display.

However, when one compares the optical path of light I1 and that of light I2 shown both in FIGS. 11A and 11B, it is clearly found the tilted liquid crystal molecules through which the light I2 passes under a field-off state may result in a non-zero phase difference ($\Delta nd \neq 0$) to cause light leakage. Accordingly, additional compensation films must be provided to eliminate the light leakage.

Figure 12:
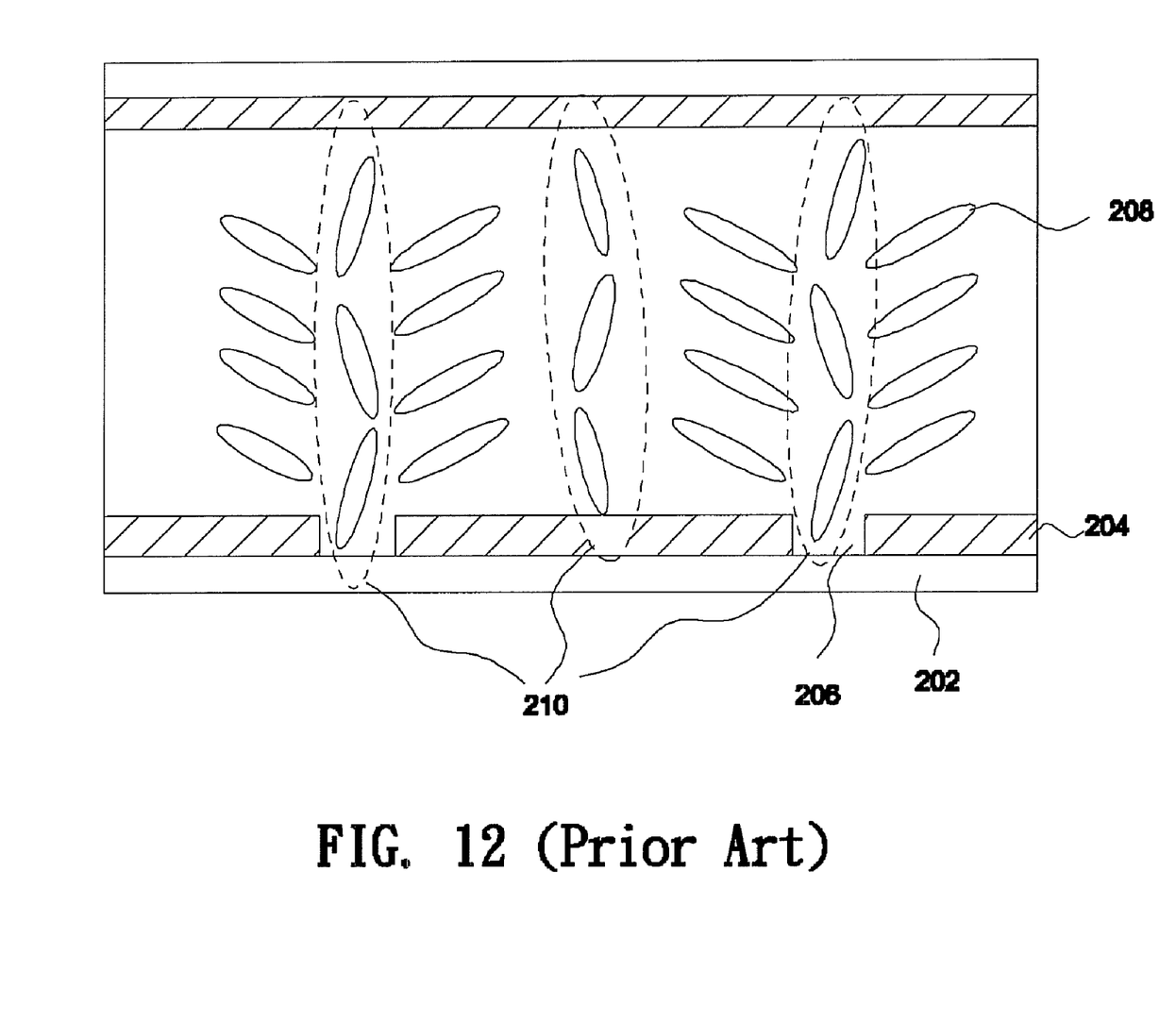
FIG. 12 shows a schematic diagram illustrating another conventional design of a multi-domain vertically aligned liquid crystal display.

FIG. 12 shows a schematic diagram illustrating another conventional design of an MVA LCD. Referring to FIG. 12, the transparent electrode 204 on the substrate 202 is provided with slits 206. Because of the fringe fields produced at edges of transparent electrode 204 and at each slit 206, the liquid crystal molecules 208 are tilted toward the center of each slit 206 to result in a multi-domain liquid crystal (LC) cell. However, the strength of the fringe fields generated by the formation of the slits 206 is often insufficient, particularly when the widths and the intervals of the slits 206 are not optimized. Besides, since the azimuth in which the liquid crystal molecules tilt due to fringe fields includes all directions of 360 degrees, a disclination region 210 often appears beyond the slits 206 or between two adjacent slits 206 to result in a reduced light transmittance.

Further, though the protrusion 106, via structure 114, or slit 206 may be provided to create multiple domains, the distribution of these structures in a picture element may reduce the active area for display and thus the aperture ratio of the picture element.

BRIEF SUMMARY OF THE INVENTION

The invention provides an a multi-domain liquid crystal display capable of solving the problems of conventional designs and having a high pixel aperture ratio and reduced capacitive coupling effect.

According to an embodiment of the invention, a multi-domain liquid crystal display includes a first and a second transparent substrates, a liquid crystal layer interposed between them, a common electrode, a first and a second metal layers, a first and a second dielectric layer, multiple pixel electrodes and multiple auxiliary electrodes. The first metal layer is formed on the second transparent substrate, and the first dielectric layer is formed on the second transparent substrate and covers the first metal layer. The second metal layer is formed on the first dielectric layer, and the second dielectric layer is formed on the first dielectric layer and covers the second metal layer. The pixel electrodes are formed on the second dielectric layer, each of the pixel electrodes having at least one opening to divide itself into a plurality of sections. The auxiliary electrodes are formed on the second dielectric layer, and each of the auxiliary electrodes extends into the opening of the pixel electrode and is adjacent to at least one section of the pixel electrode. The second metal layer is hollowed out at a position overlapping the auxiliary electrode to form at least one opening.

According to another embodiment of the invention, an array substrate includes a transparent substrate, a plurality of metallic signal lines, at least one dielectric layer, multiple pixel electrodes, multiple auxiliary electrodes and multiple storage capacitors. The dielectric layer is formed on the transparent substrate and covers the metallic signal lines. The pixel electrodes is formed on the dielectric layer, each of the pixel electrodes having at least one opening that extends from the periphery to the inside of the pixel electrode. The auxiliary electrodes are formed on the dielectric layer, and each of the auxiliary electrodes extends into the opening of the pixel electrode to produce fringe fields. Each of the storage capacitors has a first capacitor conductor beside the auxiliary electrode and a second capacitor conductor opposite the first capacitor conductor. The first capacitor conductor is hollowed out at a position overlapping the auxiliary electrode to form at least one opening.

According to the above embodiments, a multi-domain profile of a LC cell is formed by providing auxiliary electrodes that spread over the spacing regions and extend into the openings, and this can be easily achieved through typical TFT fabrication processes. Hence, compared with the conventional design where a protrusion or via structure is used to cause tilted liquid crystal molecules, the residue phase difference is eliminated to avoid light leakage according to this embodiment since all liquid crystal molecules are vertically aligned under a field-off state. Further, compared with another conventional design where slits are formed to produce fringe fields, the biased auxiliary electrodes allow for stronger field strength to tilt liquid crystal molecules so as to reduce the areas of a disclination region and thus increase the light-transmittance of an LCD. Further, since the second metal layer is hollowed out at a position overlapping the auxiliary electrode, the overlap between each auxiliary electrode and the second metal layer is considerably reduced to effectively reduce the capacitive coupling effect and minimize the variations in gray-level voltages as a result.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. In this regard, directional terminology is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
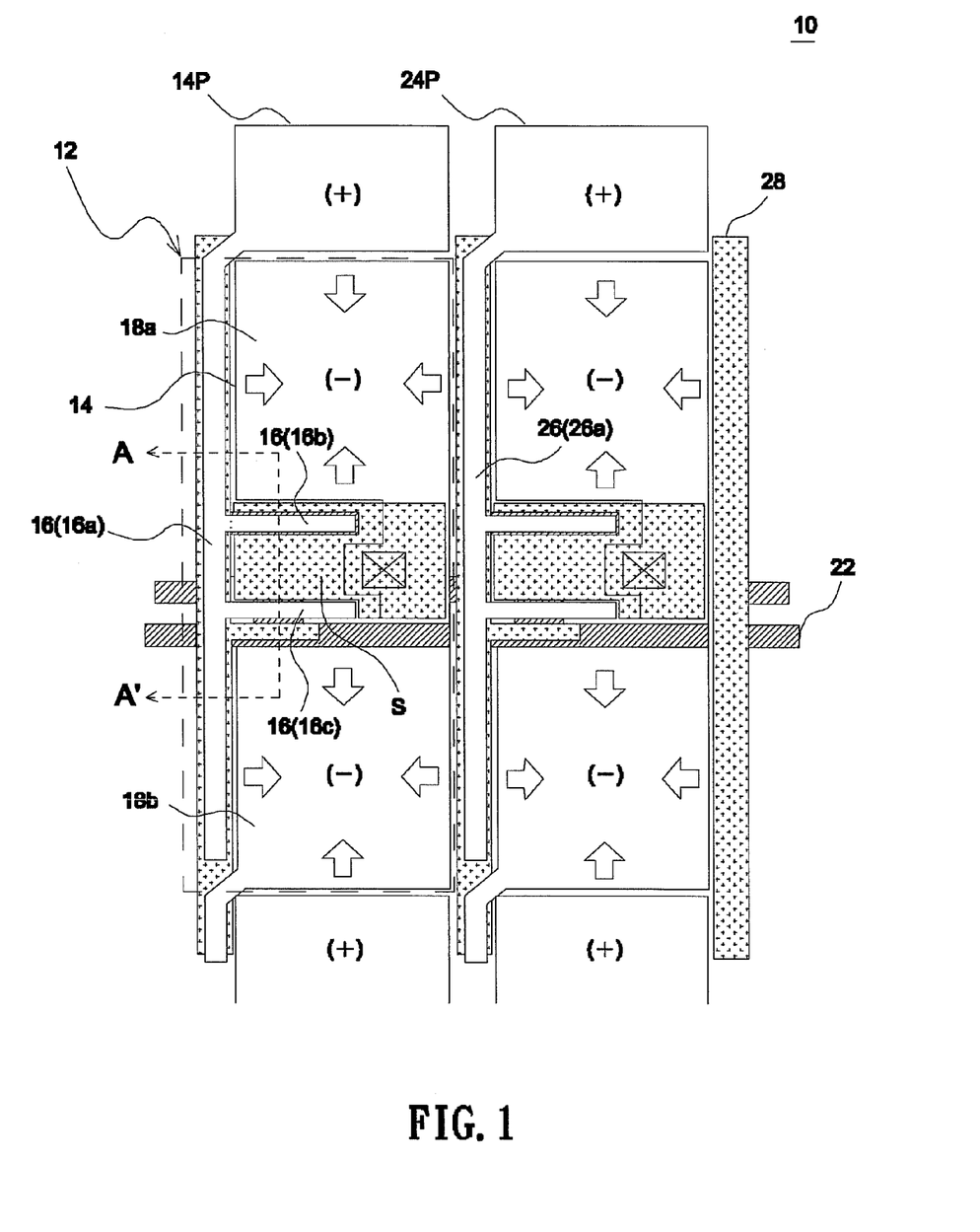
FIG. 1 is a top view observed from the normal direction of an array substrate.
Figure 2:
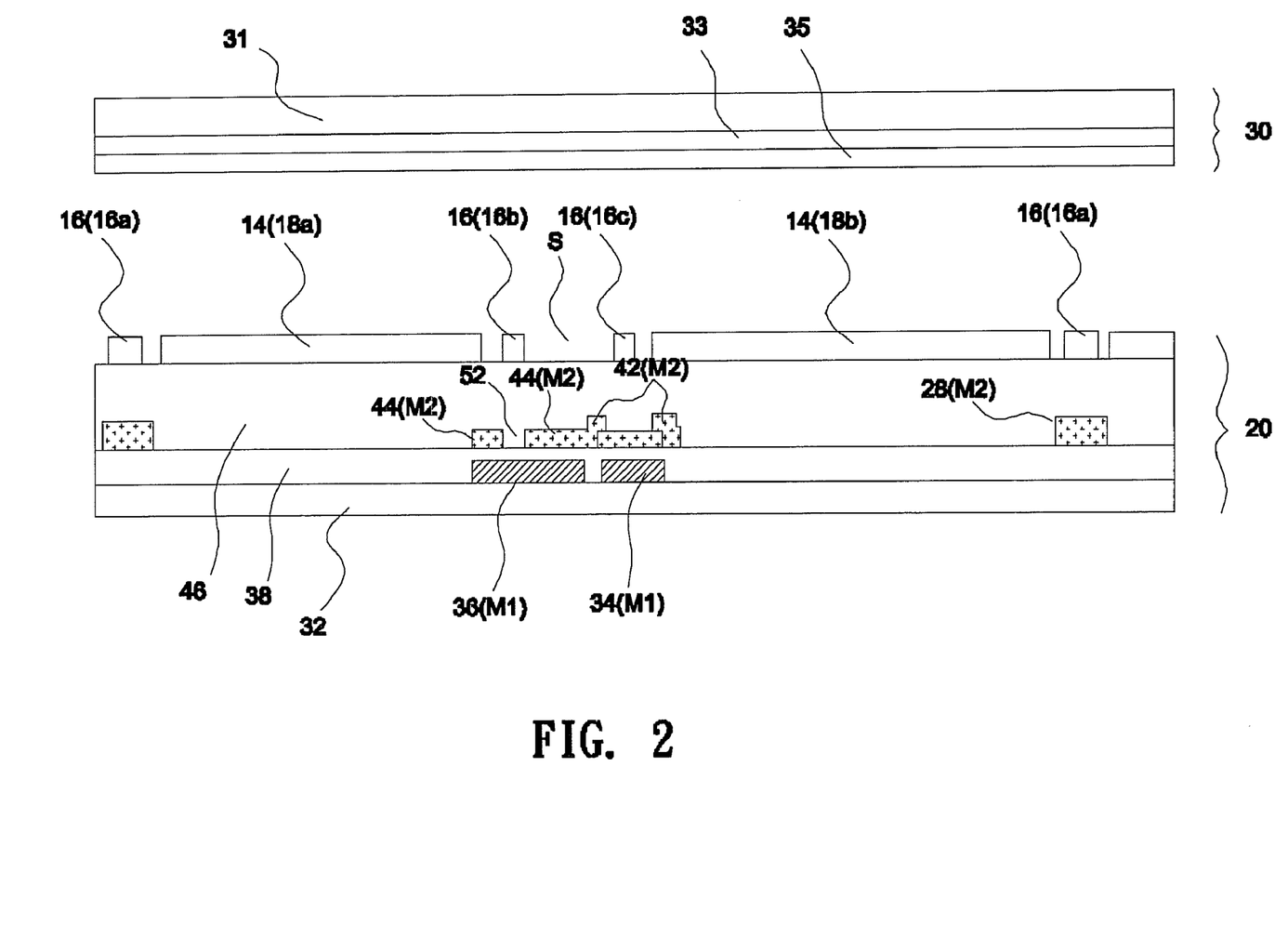
FIG. 2 is a cross-section taken along line A-A' in FIG. 1.

FIGS. 1 and 2 show schematic diagrams illustrating a multi-domain liquid crystal display according to an embodiment of the invention, where FIG. 1 is a top view observed from the normal direction of an array substrate, and FIG. 2 is a cross-section taken along line A-A' in FIG. 1.

Referring to FIG. 1, a plurality of pixel units 12 that constitute the multi-domain liquid crystal display 10 are shown. Each pixel unit 12 has a pixel electrode 14 and an auxiliary electrode 16, and each auxiliary electrode 16 positioned next to one side of a first pixel electrode 14 is connected to a second pixel electrode 14P that is vertically adjacent to the first pixel electrode 14 and controlled by a preceding scan line. Further, the non-active area, which is spread with opaque devices such as thin film transistors and storage capacitors and fails to effect display, is provided in the center portion of each pixel unit 12 to divide its active area into two display regions 18a and 18b. Further, in this embodiment, the pixel electrode 14 has a lateral opening S that extends from the periphery to the inside of the pixel electrode 14 to divide the pixel electrode 14 into two sections. Also, the auxiliary electrode 16 has a main part 16a that extends in parallel with data lines 28 and two extension parts 16b and 16c that extend in parallel with scan lines 22 and into the opening S of the pixel electrode 14.

According to the arrangement of pixel electrodes shown in FIG. 1, since each auxiliary electrode 16 positioned next to one side of a first pixel electrode 14 is connected to a second pixel electrode 14P controlled by a preceding scan line under a row inversion drive scheme, the auxiliary electrode 16 and neighboring pixel electrode 14 have opposite polarities to produce fringe fields. More specifically, taking the display region 18a with a negative polarity as an example, the pixel electrode 14P with a positive polarity controlled by a preceding scan line is placed adjacent to the top of the display region 18a, the main part 16a of the auxiliary electrode 16 extended from the pixel electrode 14P to have a positive polarity is placed adjacent to the left of the display region 18a, the extension part 16b of the auxiliary electrode 16 with a positive polarity is placed adjacent to the bottom of the display region 18a, and the main part 26a of the auxiliary electrode 26 extended from the pixel electrode 24P to have a positive polarity is placed adjacent to the right of the display region 18a. Hence, a voltage difference existing between the display region 18a with a negative polarity and surrounding electrodes with positive polarities produces fringe fields, and the orientations of liquid crystal molecules within one display region are divided into different tilt directions. Similarly, the orientations of liquid crystal molecules within the display region 18b with a negative polarity are divided into different tilt directions. In addition, under a column inversion drive scheme, each auxiliary electrode positioned next to one side of a first pixel electrode is connected to a second pixel electrode controlled by a preceding data line to produce fringe fields. The principle is similar to the embodiment mentioned above; therefore, the detail description and figures can be omitted.

Next, as shown in FIG. 2, in the color filter substrate 30, a color filter 33 and a common electrode 35 are formed on a transparent substrate 31. In the array substrate 20, a first metal layer M1 is deposited on the transparent substrate 32 and patterned to define scan lines (not shown), gate regions 34 of TFTs, and lower capacitor electrodes 36. A dielectric gate insulation layer 38 is formed on the transparent substrate 32 and covers the first metal layer M1. A second metal layer M2 is deposited on the gate insulation layer 38 and patterned to define data lines 28, source/drain regions 42 of TFTs, and upper capacitor electrodes 44. A flattened layer 46 is formed on the gate insulation layer 38 and covers the source/drain regions 42 and the upper capacitor electrodes 44. A transparent conductive film is deposited on the flattened layer 46 and patterned to define pixel electrodes 14 and auxiliary electrodes 16. In this embodiment, each lower capacitor electrodes 36 formed from the first metal layer M1 and each upper capacitor electrodes 44 formed from the second metal layer M2 together form a storage capacitor for each pixel unit 12. Further, the upper capacitor electrode 44 formed from the second metal layer M2 is hollowed out at a position overlapping the extension part 16b of the auxiliary electrode 16 to form an opening 52. As can be more clearly seen in FIG. 3, the left side diagram shows a pattern of transparent electrodes, where an opening S is formed within each pixel electrode 14 to divide it into two sections, a spacing region G is formed between two adjacent pixel electrodes 14, and each auxiliary electrode 16 spreads over the spacing region G and extends into the opening S. The right side diagram shows a pattern of the second metal layer M2, where each upper capacitor electrode 44 formed from the second metal layer M2 is hollowed out at a position corresponding to the extension part 16b of the auxiliary electrode 16 to form an opening 52.

Figure 3:
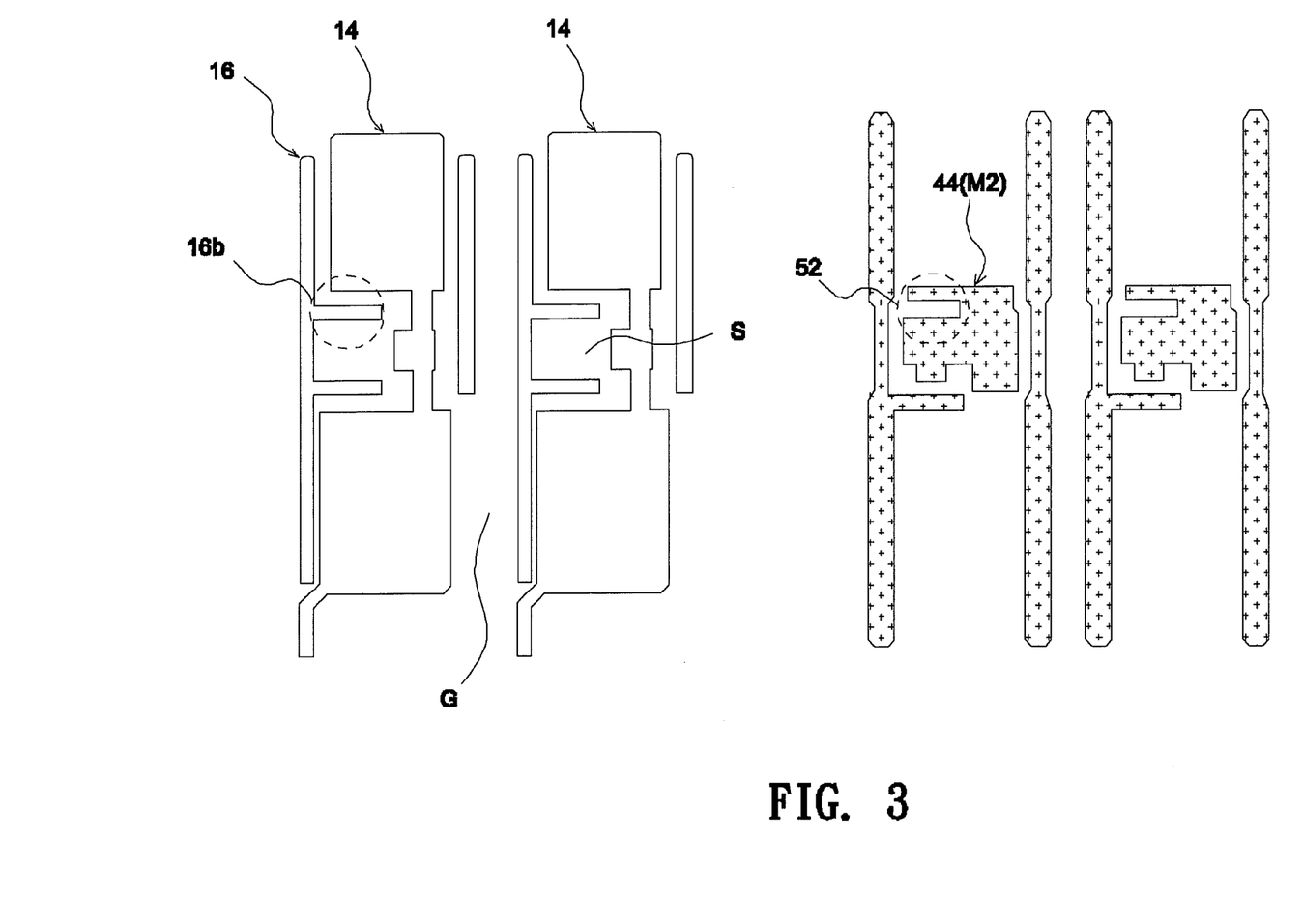
FIG. 3 show schematic diagrams of patterns of transparent electrodes and a second metal layer according to an embodiment of the invention.

According to the above embodiment, a multi-domain profile of a LC cell is formed by providing auxiliary electrodes 16 that spread over the spacing regions G and extend into the openings S, and this can be easily achieved through typical TFT fabrication processes. Hence, compared with the conventional design where a protrusion or via structure is used to cause tilted liquid crystal molecules, the residue phase difference is eliminated to avoid light leakage according to this embodiment since all liquid crystal molecules are vertically aligned under a field-off state. Further, compared with another conventional design where slits are formed to produce fringe fields, the biased auxiliary electrodes 16 allow for stronger field strength to tilt liquid crystal molecules so as to reduce the areas of a disclination region and thus increase the light-transmittance of an LCD. Further, under the design that the pixel electrodes 14 cooperate with the auxiliary electrodes 16 to produce fringe fields, the auxiliary electrode 16 that extends to the inside of each pixel unit 12 often overlaps the second metal layer M to create coupling capacitances. Hence, according to the above embodiment, since part of the upper capacitor electrode 44 which overlaps the extension part 16b of the auxiliary electrode 16 is hollowed out, the overlap between each auxiliary electrode 16 and the second metal layer M2 is considerably reduced to effectively reduce the capacitive coupling effect and minimize the variations in gray-level voltages as a result.

Figure 4:
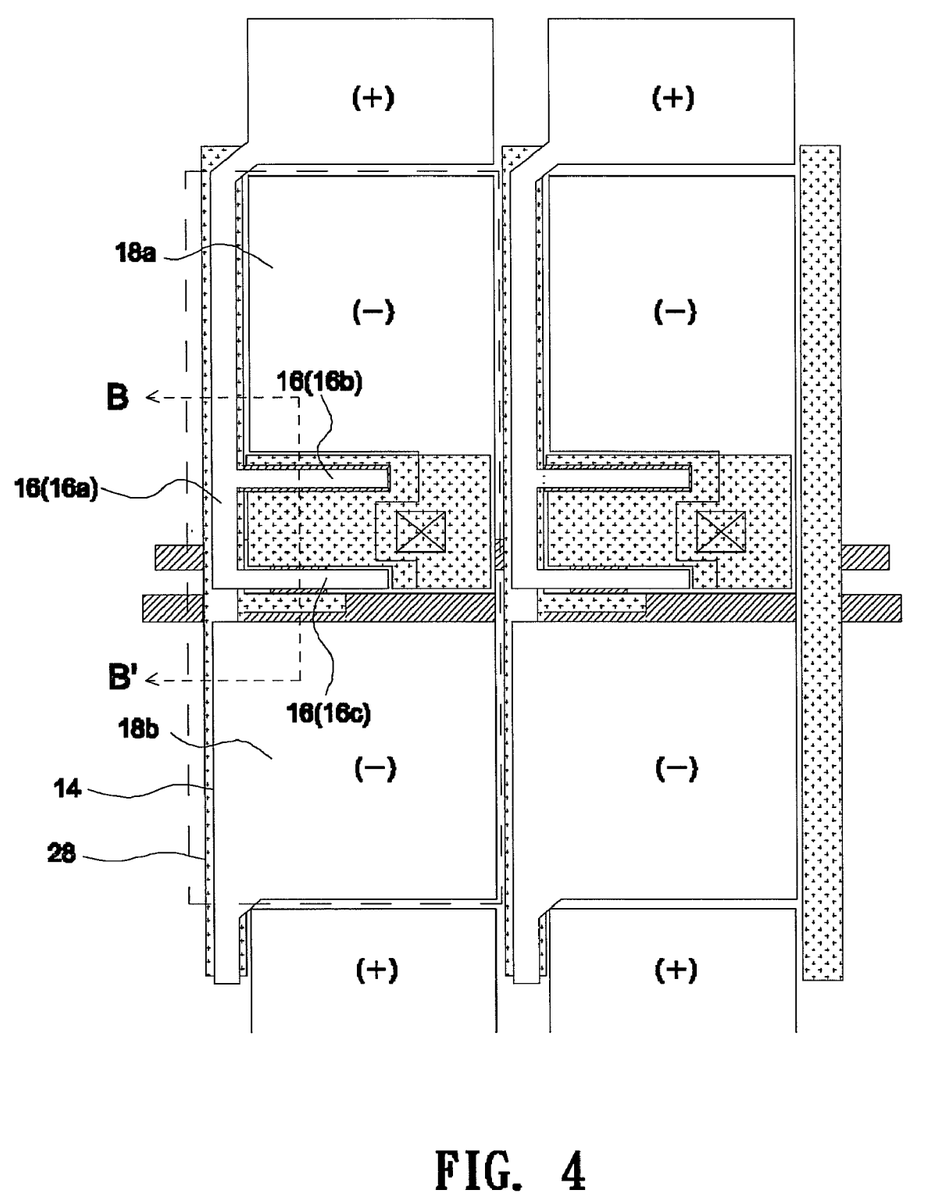
FIG. 4 shows a top view of a multi-domain liquid crystal display according to another embodiment of the invention.
Figure 5:
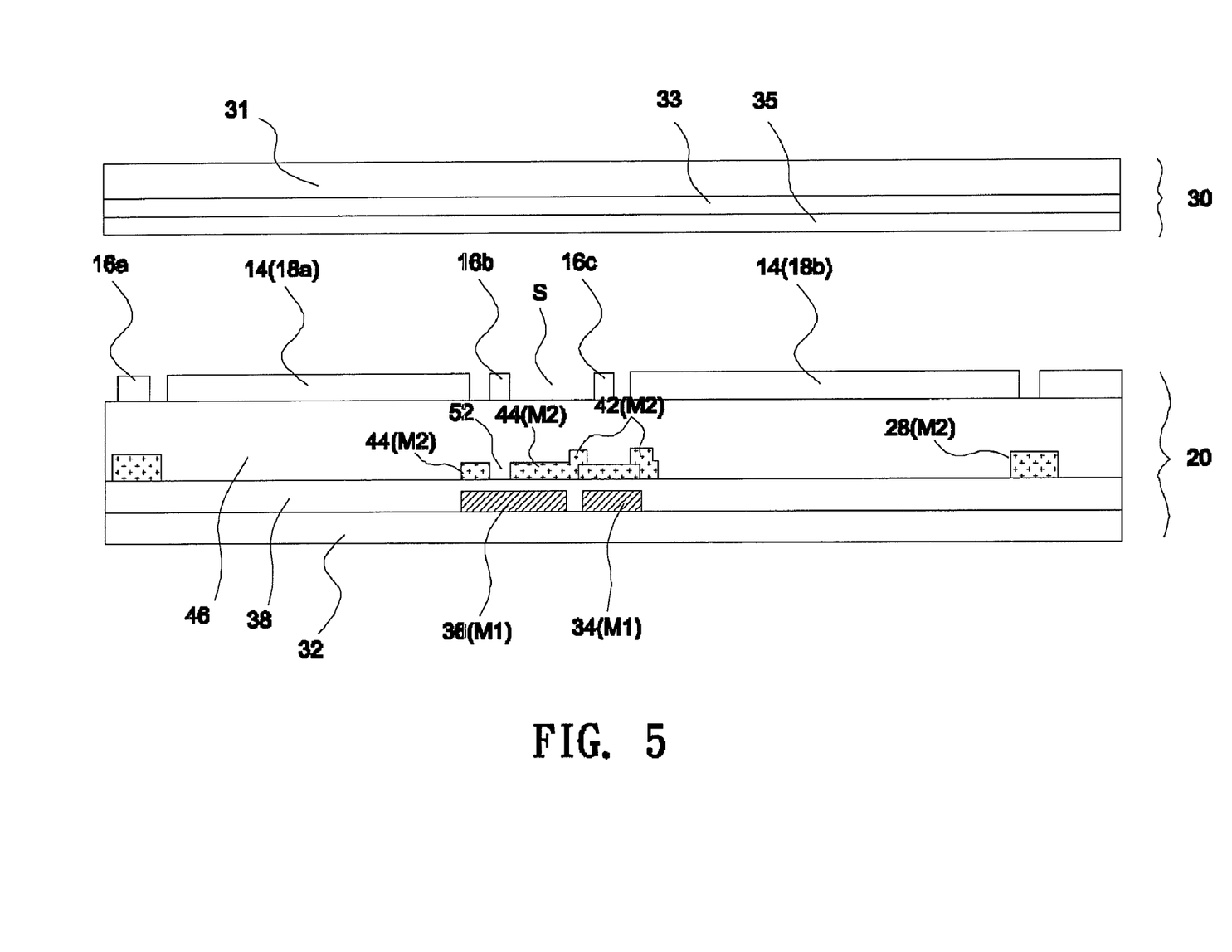
FIG. 5 is a cross-section taken along line B-B' in FIG. 5.

FIG. 4 shows a top view of a multi-domain liquid crystal display according to another embodiment of the invention, and FIG. 5 is a cross-section taken along line B-B' in FIG. 5. The embodiment shown in FIG. 4 and FIG. 5 is similar to that shown in FIG. 1, where the upper capacitor electrode 44 formed from the second metal layer M2 is hollowed out at a position overlapping the extension part 16b of the auxiliary electrode 16 to form an opening 52, except the lower half of the main part 16a adjacent to the longitudinal side of the display region 18b is removed. The elimination of the lower half of the main part 16a may reduce the overlap between the auxiliary electrode 16 and the date line 28 formed from the second metal layer M2 to further reduce the capacitive coupling effect. Besides, since the former lower half of the main part 16a is not provided, the display region 18b may extend to the left side farther to cover vacant region, thus improving the aperture ratio of the pixel unit 12. Note that even the lower half of the main part 16a adjacent to the longitudinal side of the display region 18b is removed, the voltage differences exist between the display region 18b and its horizontally-adjacent pixel electrodes 14 under a line inversion scheme, and the voltage differences exist between the display region 18b and surrounding pixel electrodes 14 under a dot inversion scheme all allow for the formation of fringe fields.

Figure 6:
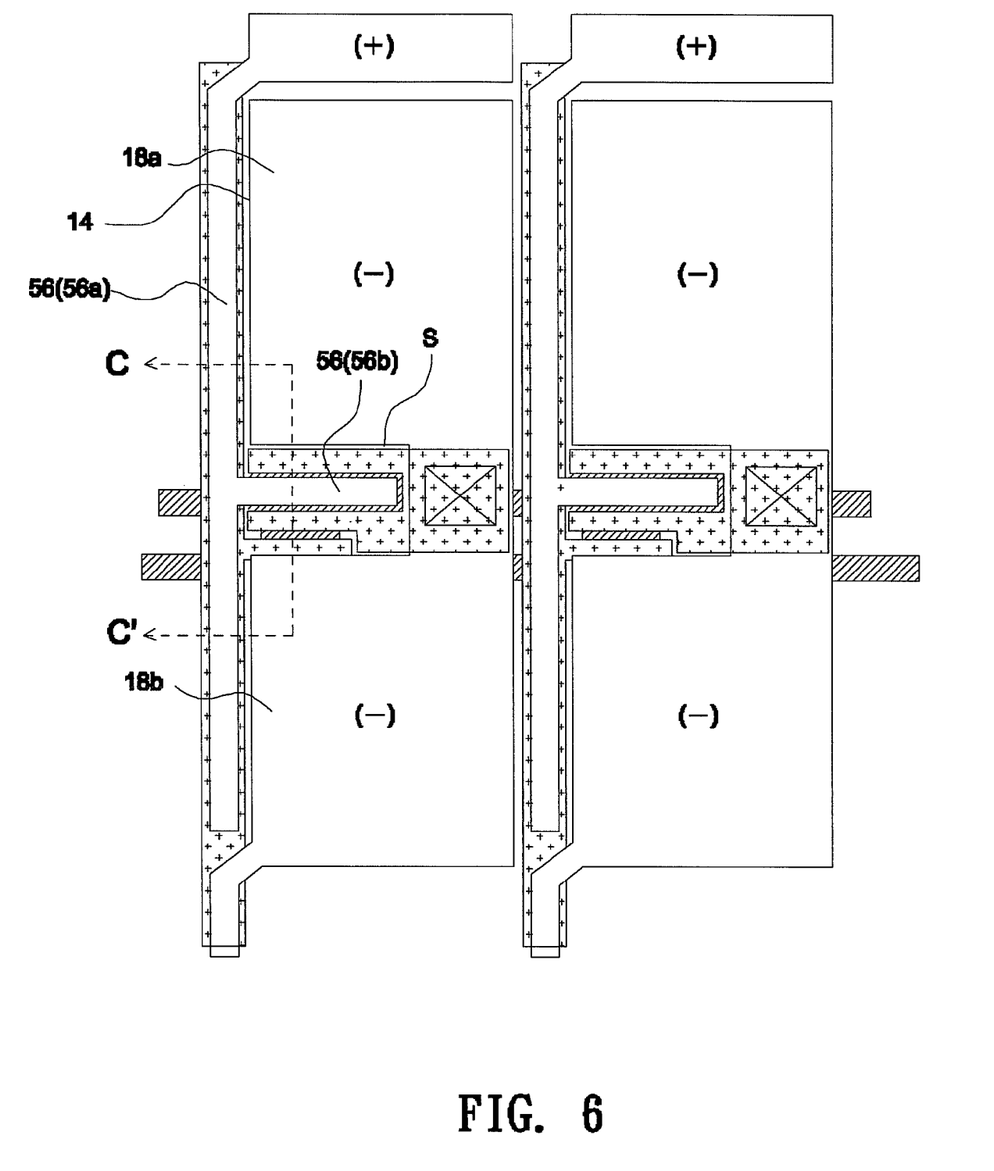
FIG. 6 shows a top view of a multi-domain liquid crystal display according to another embodiment of the invention.
Figure 7:
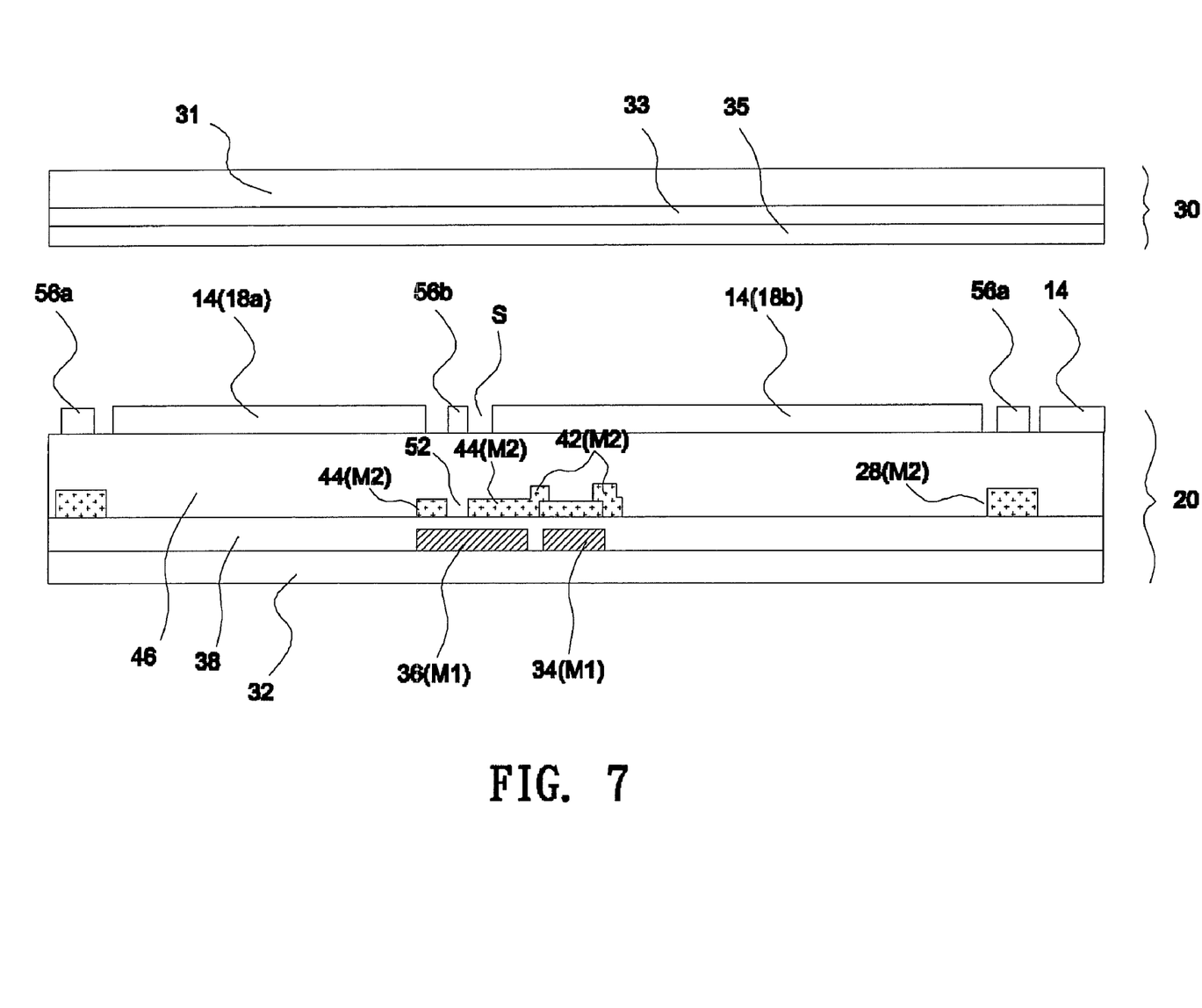
FIG. 7 is a cross-section taken along line C-C' in FIG. 6.

FIG. 6 shows a top view of a multi-domain liquid crystal display according to another embodiment of the invention, and FIG. 7 is a cross-section taken along line C-C' in FIG. 6. Referring to FIG. 6, the pixel electrode 14 is provided with an opening S that extends from the periphery to the inside of the pixel electrode 14, and the auxiliary electrode 56 has a main part 56a and a single extension part 56b that extends into the opening S. In this embodiment, voltage differences exist between the extension part 56b (positive polarity) and display regions 18a and 18b (negative polarity) to produce fringe fields. Further, as shown in FIG. 7, the upper capacitor electrode 44 formed from the second metal layer M2 is also hollowed out at a position overlapping the single extension part 56b to form an opening 52 and as a result reduce the capacitive coupling effect.

Figure 8:
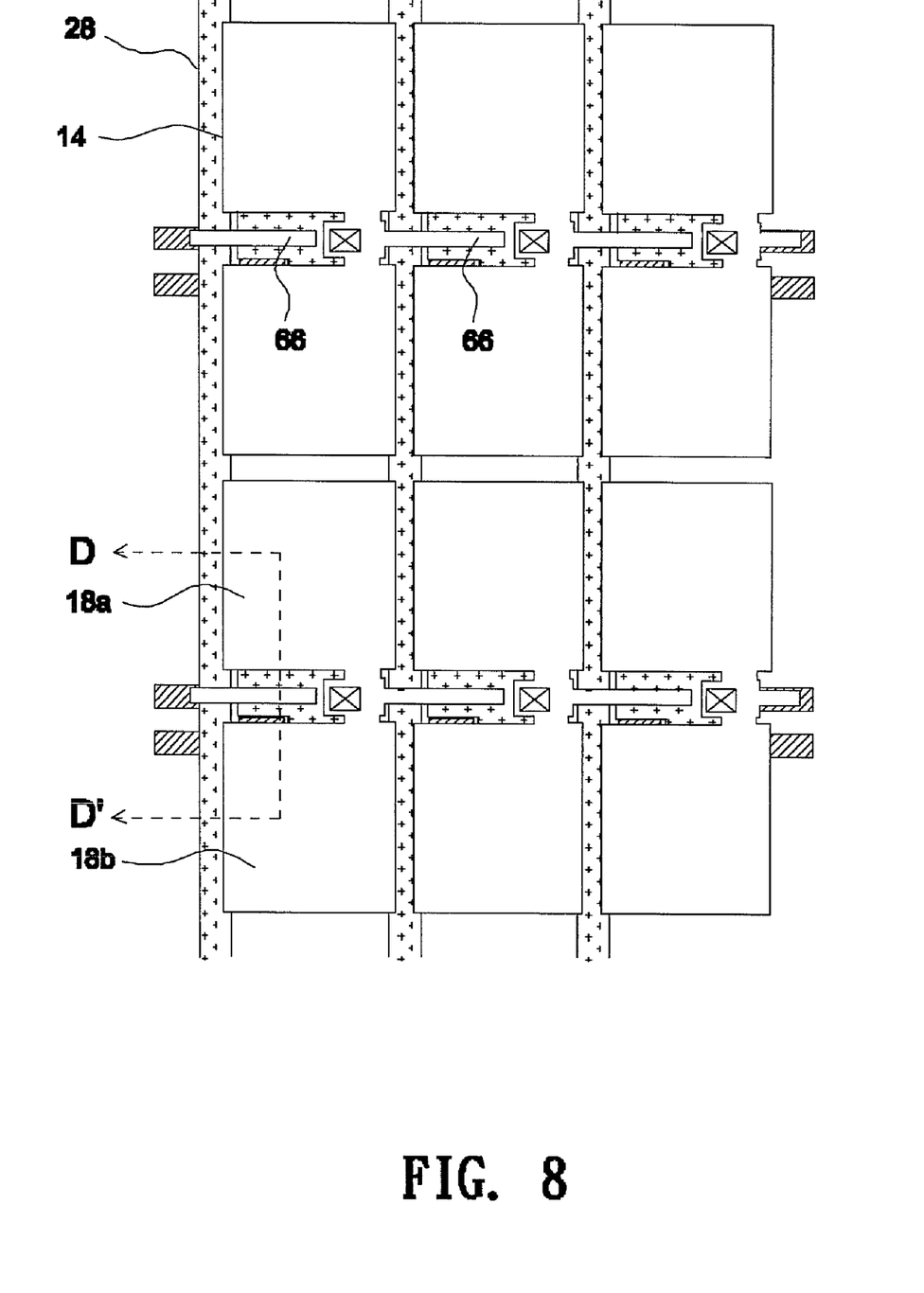
FIG. 8 shows a top view of a multi-domain liquid crystal display according to another embodiment of the invention.
Figure 9:
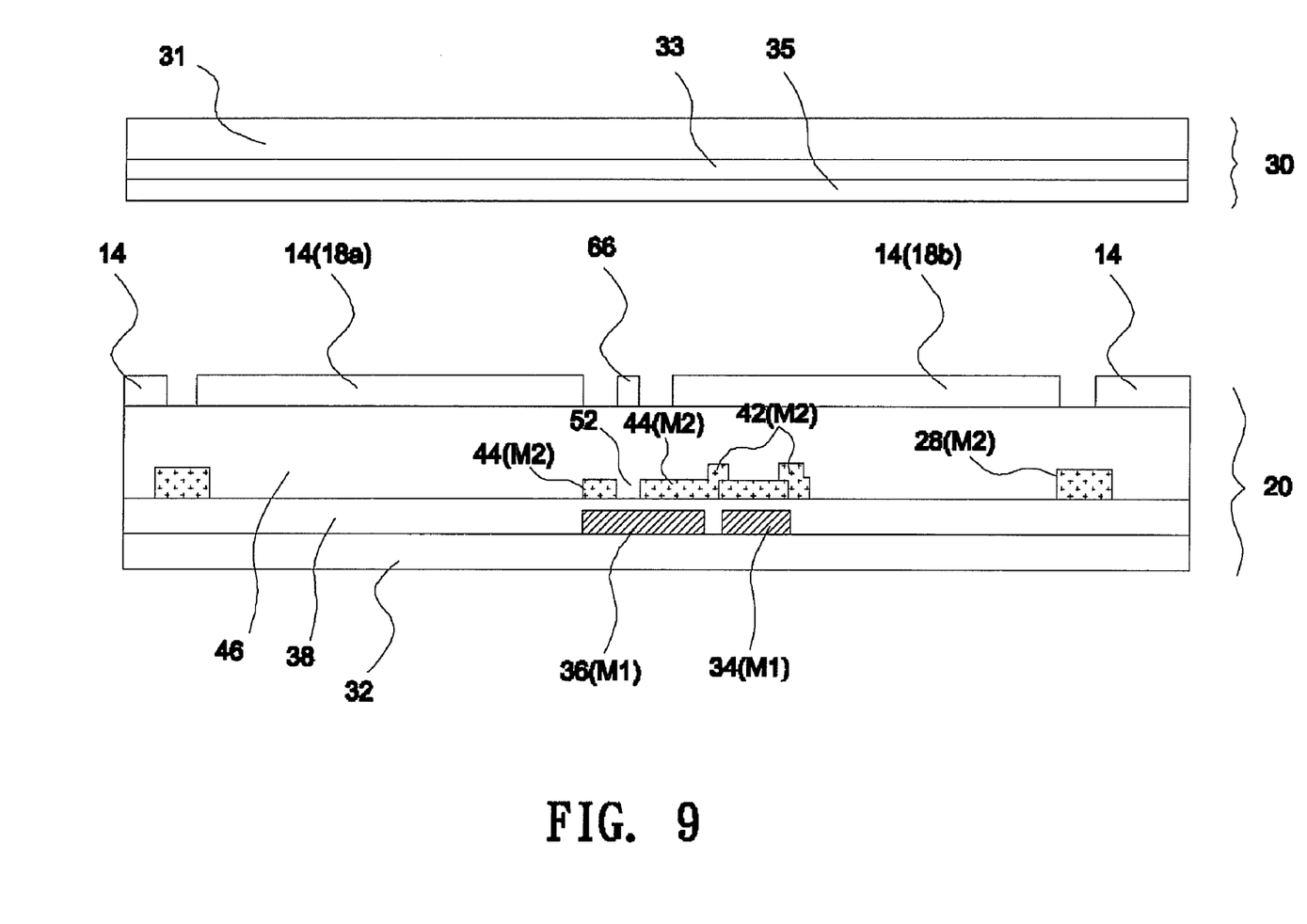
FIG. 9 is a cross-section taken along line D-D' in FIG. 8.
Figure 10:
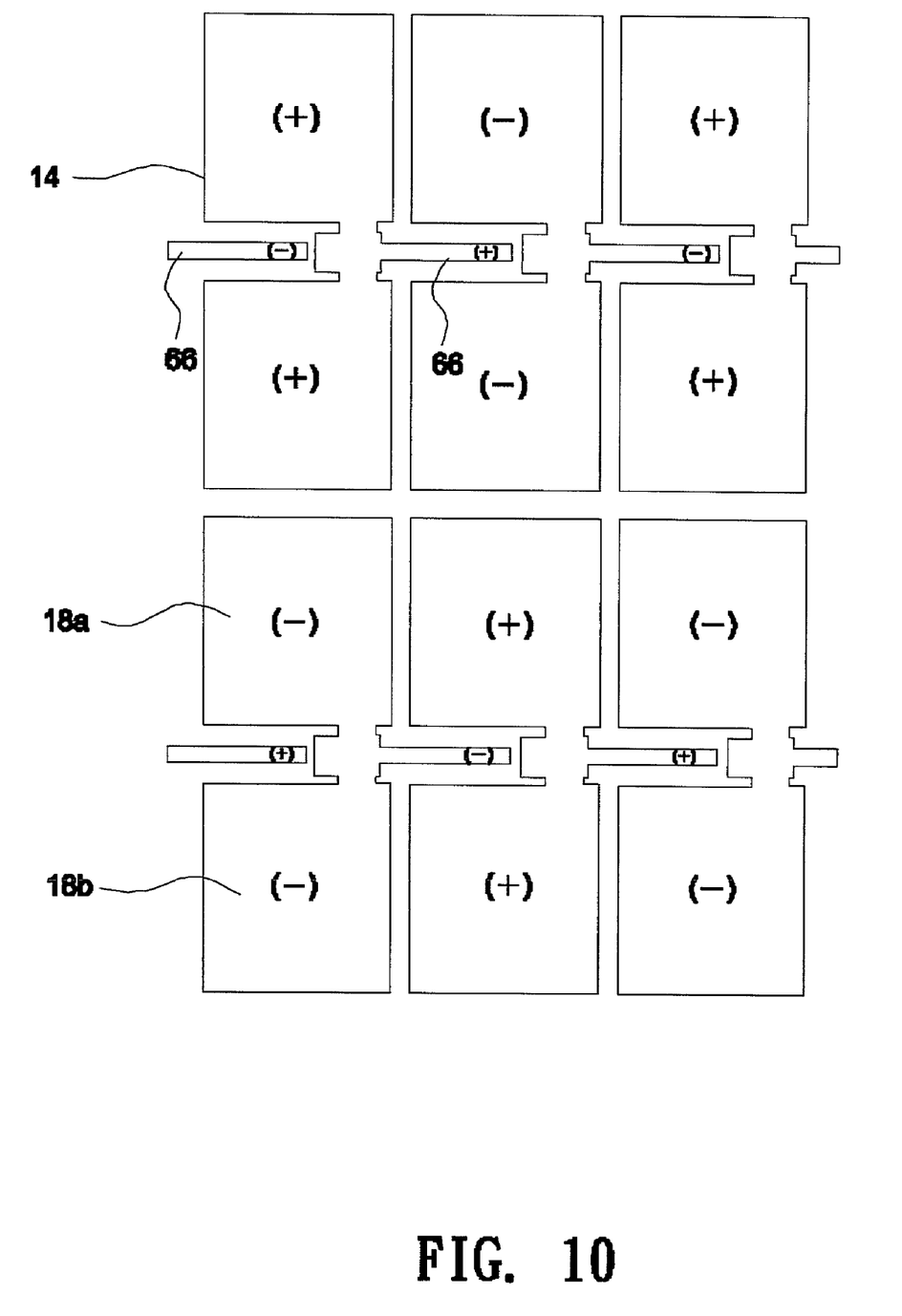
FIG. 10 shows a polarity diagram of the embodiment shown in FIG. 8.

FIG. 8 shows a top view of a multi-domain liquid crystal display according to another embodiment of the invention, and FIG. 9 is a cross-section taken along line D-D' in FIG. 8. In this embodiment, a single horizontally-extending section protruding from the center portion of a pixel electrode 14 form a complete auxiliary electrodé 66; more specifically, each auxiliary electrode 66 that is positioned next to one side and extends into the opening of a first pixel electrode is connected to a second pixel electrode controlled by a preceding data line. Hence, the auxiliary electrode 66 is not formed to overlap the data line 28 formed from the second metal layer M2 to further reduce the capacitive coupling effect. Besides, the display region of the pixel electrode 14 may extend to the right and left sides farther to cover the vacant region, thus improving the aperture ratio of the pixel unit 12. Also, as shown in FIG. 9, the upper capacitor electrode 44 formed from the second metal layer M2 is also hollowed out at a position overlapping the auxiliary electrode 66 to form an opening 52. Besides, as shown in FIG. 10, when the pattern of transparent electrodes shown in FIG. 8 is driven by a dot inversion scheme, each display region 18a or 18b has an opposite polarity in relation to surrounding auxiliary electrodes 66 or surrounding display regions to produce fringe fields.

Also, a reflective metallic film may be provided in the multi-domain pixel structure shown in the above embodiments to effect reflective display, and the reflective metallic film may spread over the non-active area, which is spread with opaque devices such as thin film transistors and storage capacitors, to maintain a high aperture ratio. Further, the capacitive coupling effect can be reduced as long as part of the second metal layer M2 that overlaps the auxiliary electrode is hollowed out, and it is not limited to remove part of the capacitor electrode to achieve such purpose. For example, the capacitive coupling effect may also be reduced by forming a longitudinal opening on the data line 28 to reduce the overlap between each auxiliary electrode 16 and the second metal layer M2. Besides, each auxiliary electrode 16 may be formed only in the opening S of the pixel electrode 14 or only in the spacing region G to produce fringe fields, and, in that case, the capacitive coupling effect can be also reduced as part of the second metal layer M2 that overlaps the auxiliary electrode 16 is hollowed out.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multi-domain liquid crystal display, comprising:
   a first and a second transparent substrates facing to each other;
   a liquid crystal layer interposed between the first and the second transparent substrates;
   a common electrode provided on the first transparent substrate;
   a first metal layer formed on the second transparent substrate;
   a first dielectric layer formed on the second transparent substrate and covering the first metal layer;
   a second metal layer formed on the first dielectric layer;
   a second dielectric layer formed on the first dielectric layer and covering the second metal layer;
   a plurality of pixel electrodes formed on the second dielectric layer, each of the pixel electrodes having at least one opening to divide itself into a plurality of sections; and
   a plurality of auxiliary electrodes formed on the second dielectric layer, wherein each of the auxiliary electrodes with a first polarity has at least one extension part extending into the opening of the pixel electrode with a second polarity that is opposite to the first polarity;
   wherein the second metal layer is hollowed out to form at least one opening at a position overlapping the at least one extension part of the auxiliary electrode in the opening of the pixel electrode, the first metal layer is patterned to define multiple first signal lines, the second metal layer is patterned to define multiple second signal lines, and each auxiliary electrode positioned next to one side of a first pixel electrode is connected to a second pixel electrode controlled by a preceding first signal line or a preceding second signal line.

2. The multi-domain liquid crystal display as claimed in claim 1, wherein each of the auxiliary electrodes has a main part and the at least one extension part that protrudes from the main part and extends into the opening of the pixel electrode.

3. The multi-domain liquid crystal display as claimed in claim 2, wherein the opening of the second metal layer overlaps the at least one extension part of the auxiliary electrode.

4. The multi-domain liquid crystal display as claimed in claim 2, wherein the main part of each auxiliary electrode extends in parallel with the second signal lines and overlaps the opening of the second metal layer.

5. The multi-domain liquid crystal display as claimed in claim 1, wherein each of the auxiliary electrodes has a main part and two extension parts that extend into the opening of the pixel electrode, with the two extension parts being respectively adjacent to two different sections of the pixel electrode.

6. The multi-domain liquid crystal display as claimed in claim 1, wherein each of the auxiliary electrodes is formed by a single horizontally-extending section of a pixel electrode.

7. The multi-domain liquid crystal display as claimed in claim 1, wherein the second metal layer is patterned to define capacitor electrodes and part of the capacitor electrodes is hollowed out at a position overlapping the auxiliary electrode to form at least one opening.

8. The multi-domain liquid crystal display as claimed in claim 1, wherein each auxiliary electrode and the section of the pixel electrode with which the auxiliary electrode is contiguous have opposite polarities under the same frame of an inversion drive scheme.

9. The multi-domain liquid crystal display as claimed in claim 1, wherein the first dielectric layer is a gate insulation layer and the second dielectric layer is a flattened layer.

10. The multi-domain liquid crystal display as claimed in claim 1, further comprising a reflective layer spreading over the non-active area of the multi-domain liquid crystal display.

11. A multi-domain liquid crystal display, comprising:
    a first and a second transparent substrates facing to each other;
    a liquid crystal layer interposed between the first and the second transparent substrates;
    a common electrode provided on the first transparent substrate;
    a first metal layer formed on the second transparent substrate and patterned to define a plurality of lower capacitor electrodes;
    a first dielectric layer formed on the second transparent substrate and covering the first metal layer;
    a second metal layer formed on the first dielectric layer and patterned to define a plurality of upper capacitor electrodes;
    a second dielectric layer formed on the first dielectric layer and covering the second metal layer;
    a plurality of pixel electrodes formed on the second dielectric layer, each of the pixel electrodes having at least one opening that extends from the periphery to the inside of the pixel electrode to divide itself into a plurality of sections; and
    a plurality of auxiliary electrode formed on the second dielectric layer, each of the auxiliary electrodes with a first polarity being positioned next to at least one side of the section of the pixel electrode and extending into the opening of the pixel electrode with a second polarity that is opposite to the first polarity;

wherein each of the upper capacitor electrodes is hollowed out at a position overlapping the auxiliary electrode to form at least one opening.

12. The multi-domain liquid crystal display as claimed in claim 11, wherein the first metal layer is patterned to define multiple scan lines, the second metal layer is patterned to define multiple data lines, and each auxiliary electrode positioned next to one side of a first pixel electrode is connected to a second pixel electrode controlled by a preceding scan line.

13. The multi-domain liquid crystal display as claimed in claim 12, wherein each of the auxiliary electrodes has a main part and at least one extension part that protrudes from the main part and extends into the opening of the pixel electrode, with the extension part overlapping the opening of the upper capacitor electrode.

14. The multi-domain liquid crystal display as claimed in claim 11, wherein the first metal layer is patterned to define multiple scan lines, the second metal layer is patterned to define multiple data lines, and each auxiliary electrode positioned next to one side of a first pixel electrode is connected to a second pixel electrode controlled by a preceding data line.

15. The multi-domain liquid crystal display as claimed in claim 14, wherein each of the auxiliary electrodes is formed by a single horizontally-extending section protruding from the second pixel electrode and extending into the opening of the first pixel electrode.

16. The multi-domain liquid crystal display as claimed in claim 11, wherein each auxiliary electrode and the section of the pixel electrode that the auxiliary electrode at least partially surrounds have opposite polarities under the same frame of an inversion drive scheme.

17. An array substrate of a liquid crystal display, comprising:
    a transparent substrate;
    a plurality of metallic signal lines formed on the transparent substrate;
    at least one dielectric layer formed on the transparent substrate and covering the metallic signal lines;
    a plurality of pixel electrodes formed on the dielectric layer, each of the pixel electrodes having at least one opening that extends from the periphery to the inside of the pixel electrode;
    a plurality of auxiliary electrodes formed on the dielectric layer, wherein each of the auxiliary electrodes has at least one extension part extending into the opening of the pixel electrode to produce fringe fields; and
    a plurality of storage capacitors, each of the storage capacitors having a first capacitor conductor beside the auxiliary electrode and a second capacitor conductor opposite the first capacitor conductor, with the first capacitor conductor being hollowed out to form at least one opening at a position overlapping the at least one extension part of the auxiliary electrode in the opening of the pixel electrode,
    wherein the metallic signal lines comprise a plurality of data lines and scan lines, and each auxiliary electrode positioned next to one side of a first pixel electrode is connected to a second pixel electrode controlled by a preceding scan line.

18. The array substrate as claimed in claim 17, wherein each of the auxiliary electrodes has a main part that extends in parallel with the data lines and the at least one extension part that extends in parallel with the scan lines and into the opening of the pixel electrode, with the at least one extension part overlapping the opening of the first capacitor conductor.

19. The array substrate as claimed in claim 17, wherein the metallic signal lines comprises a plurality of data lines and scan lines, and each auxiliary electrode positioned next to one side of a first pixel electrode is connected to a second pixel electrode controlled by a preceding data line.

20. The array substrate as claimed in claim 19, wherein each of the auxiliary electrodes is formed by a single horizontally-extending section protruding from the second pixel electrode and extending into the opening of the first pixel electrode.

* * * * *